United States Patent [19]

Bruner et al.

[11] 4,266,485

[45] May 12, 1981

[54] CONTROL SYSTEM FOR ECONOMIC OPERATION OF MULTIPLE LOCOMOTIVE TRAINS

[75] Inventors: Frank D. Bruner; Joseph Kuzela, Jr., both of Omaha, Nebr.

[73] Assignee: Vapor Corporation, Chicago, Ill.

[21] Appl. No.: 930,463

[22] Filed: Aug. 3, 1978

[51] Int. Cl.³ .............................................. H02P 1/58
[52] U.S. Cl. ........................................ 105/61; 318/91
[58] Field of Search ...................... 105/61; 318/90, 91, 318/102

[56] References Cited

U.S. PATENT DOCUMENTS

| 3,601,671 | 8/1971 | Little | 105/61 |
| 3,696,758 | 10/1972 | Godinez, Jr. | 105/61 |
| 3,745,933 | 7/1973 | Eisele et al. | 105/61 |

*Primary Examiner*—Richard A. Bertsch
*Attorney, Agent, or Firm*—Francis J. Lidd

[57] ABSTRACT

A system for controlling tractive effort in diesel electric locomotives when train hauling requirements are such that multiple locomotives are required. Equipment and method of operation disclosed provides individual control of lead and trailing units, utilizing relatively simple, reliable and inexpensive equipment which operates in conjunction with existing train controls. Operation of multiple locomotive trains at reduced horsepower settings per trailing loads will provide maximum fuel economy for varying track conditions.

28 Claims, 8 Drawing Figures

FIG. 4
| THROTTLE POSITION | REMOTE UNITS | | | | GENERATOR FIELD |
|---|---|---|---|---|---|
| | A | B | C | D | |
| IDLE | 1 | 2 | 3 | 4 | 5 |
| 1 | | | | | X |
| 2 | X | | | | X |
| 3 | | | X | | X |
| 4 | X | | X | | X |
| 5 | | X | X | X | X |
| 6 | X | X | X | X | X |
| 7 | | X | X | | X |
| 8 | X | X | X | | X |
| TRAINLINE WIRES | 15 | 12 | 7 | 3 | 6 |
FIG. 5
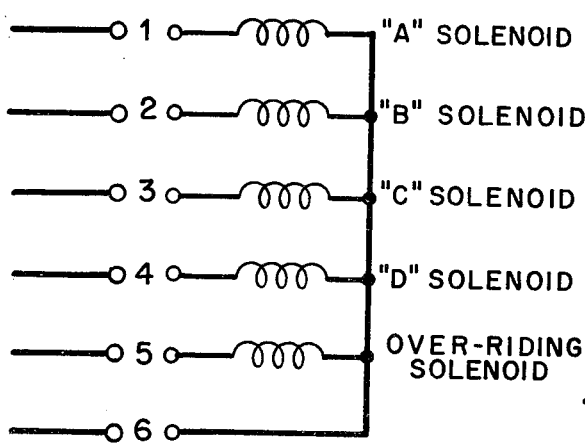
- 1 — "A" SOLENOID
- 2 — "B" SOLENOID
- 3 — "C" SOLENOID
- 4 — "D" SOLENOID
- 5 — OVER-RIDING SOLENOID
- 6
FIG. 7
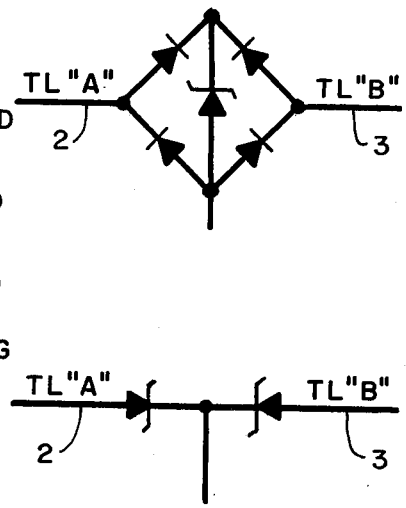
FIG. 8

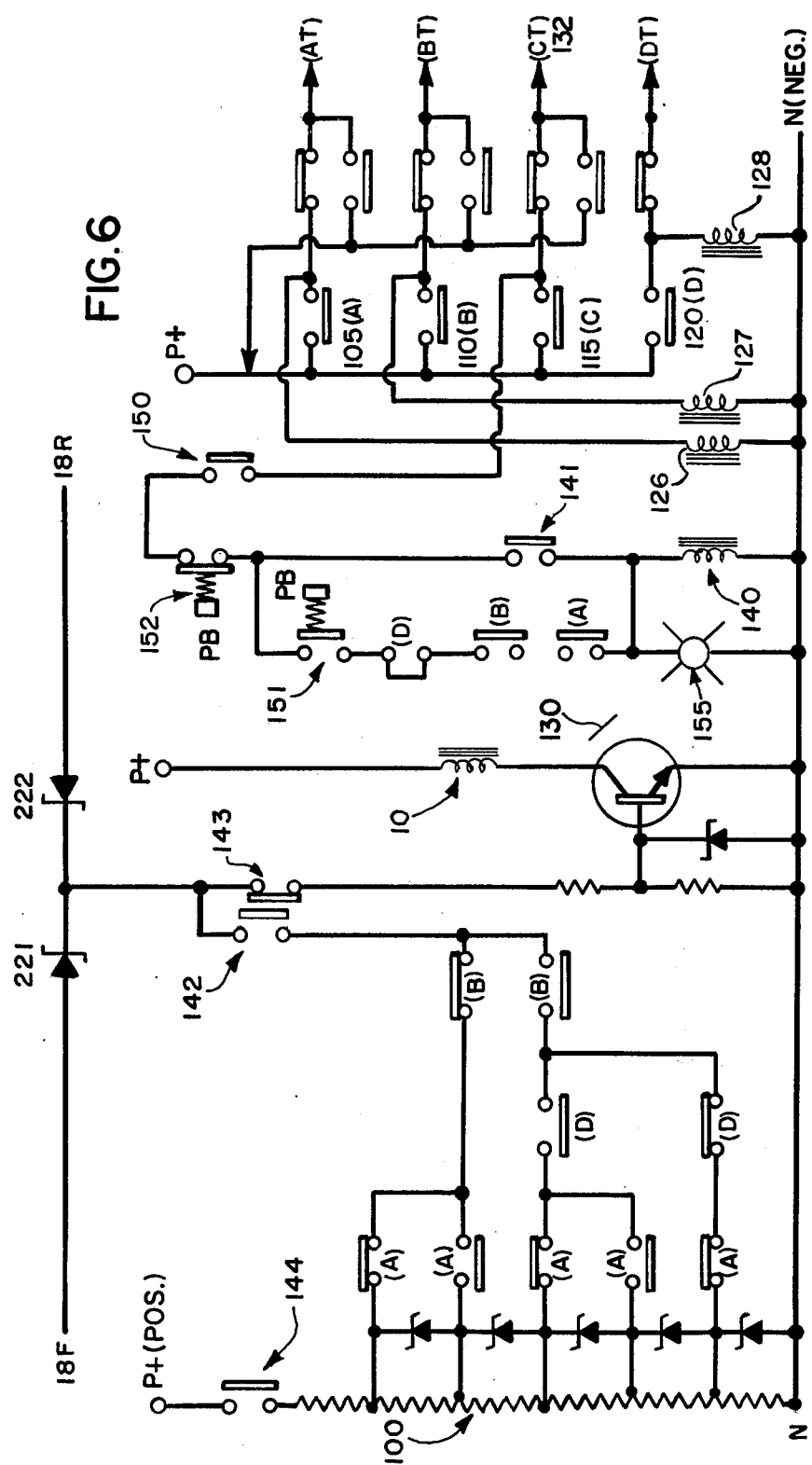

CONTROL SYSTEM FOR ECONOMIC OPERATION OF MULTIPLE LOCOMOTIVE TRAINS

BACKGROUND OF THE INVENTION

This invention relates generally to throttle control of diesel electric locomotives and in particular to control of the number of locomotives providing tractive effort for a freight train where maximum tractive effort is only required for a portion of the freight movement. It is well known that for the majority of diesel electric locomotives in operation today, manufacturers have, in order to provide desired tractive characteristics, designed units where high efficiency occurs at one or perhaps two throttle settings. Therefore, operation of a locomotive at other than a pre-selected throttle setting results in measurable reduction in ton miles per gallon of fuel consumed.

Present freight handling requirements have resulted in trains of a hundred or more cars operating on roadbeds where the horsepower requirements vary from one horsepower/ton to six horsepower/tons. This variation is due to existing weather conditions, grades and speeds to meet trains schedules. It is highly desirable to operate the present modern diesel electric locomotives at a throttle setting very near its maximum rated horsepower, however, when several locomotives are needed to pull a substantial train over a distance where variation in tractive effort is encountered, present control methods wherein each power unit, controlled from a single lead unit operates at identical throttle settings, resulting in relatively poor fuel economy.

Recent dramatic increases in fuel costs were not foreseen during the initial design of currently operating locomotives, therefore it is necessary to provide control equipment which allows operation of a multiple locomotive train over a extremely wide range of horsepower or individual unit throttle settings. Existing "trainline" control utilizes a highly reliable system of control wires passing through each locomotive and actuating the governors of the individual locomotives. In this way although the governor adjusts the specific fuel consumption for loads imposed on the unit, the maximum horsepower available is limited by the particular throttle position of the locomotive electrohydraulic governor. The most commonly used governors provide eight throttle settings allowing operators to utilize the inherent advantages of the diesel electric locomotive to provide increased torque for train starting and higher speed when under way. However as indicated above, the maximum efficiency occurs in at most two of the eight settings, therefore utilizing the present control system, maximum fuel economy only occurs at or near the maximum total horsepower requirement, since all units follow the lead throttle setting. With this system when operating under moderate horsepower requirements it is necessary to operate each unit at a relatively inefficient low throttle setting resulting in reduced fuel economy.

In a known unit which provides individual control of locomotives in multiple locomotives trains or consists, a relatively complicated switching system is utilized which employs two trainline wires. Additionally, individual units must be selected, i.e., each lead and training locomotive must be specifically adjusted for its position in the consists in order to be properly controlled. Control switches are used on each unit to pre-select each unit as to its position in the consist. This requires an extra employee assignment or added duties for existing personnel to perform. This requirement has substantial shortcomings when it is necessary to "break up locomotive consists" or separate units from other units in a consist add or remove units.

At major rail terminating terminals the train consists or makeup of locomotives and cars are broken up, separated or turned, to make up a new train for a return trip. Engines are controlled by action of a manual selector switch, requiring individual adjustments of each locomotive. Another disadvantage of the known unit is that engines are controlled by energizing one or two trainline wires or both trainline wires used. This usually limits the reduction of units to 3 locomotive units. When switching from one unit in reduced power mode to two units in reduce mode, three units are reduced monentarily. This can cause an excessive reduction of power at times.

Therefore, the invention disclosed here provides a method which is insensitive to position in the train, and therefore does not require individual settings, utilizes only one trainline wire, is self-compensating in the case of inadvertent connection of a lead unit in a trailing position and provides a relatively uncomplicated indication of the operating units, wherein each is adjusted to its maximum efficiency. The system and devices disclosed will control more locomotive units, with finer control of the locomotives.

OBJECTS OF THE INVENTION

It is the object of the invention to provide a method for operating multiple diesel electric locomotives, with individual units at the most economic throttle setting.

It is a further object of the invention to provide a locomotive controller which is compatible with the existing locomotive governor and provides remote adjustment of the governor to economic throttle settings.

It is a further object of this invention to provide individual remote control of trailing units in a multiple locomotive consist utilizing a single trainline wire.

It is a still further object of this invention to provide a control system utilizing individual control devices, automatically operating in lead or trailing modes which can be interconnected at either end of any unit without adjustments or setup procedures.

It is an additional object of this invention to provide a controller for maximum economic operation of a multiple locomotive consist from a single lead unit.

It is a further additional object of this invention to provide a control system which allows automatic maximization of fuel economy from the throttle of a lead locomotive.

SUMMARY OF THE INVENTION

The system method and components disclosed utilizes a relatively simple electronic and electromechanical approach to trimming all units in a multiple locomotive consist for maximum fuel economy. All units as indicated above communicate with a single trainline wire and the particular location of each unit and the setting of the control component automatically determine its function either as a trailing or leading unit.

In keeping with the concept of the invention each unit is provided with a control box or device containing semiconductor components and an electromechanical stepswitch. The stepswitch is essentially used to provide connections to variable voltage steps on levels to the trainline control wire. The stepswitch is also used to provide indication through the use of light-emitting diodes of the particular throttle setting of the trailing unit containing the device. The control component is also responsive to its position in the consist and is self-adjusting in that operation of any given unit as a lead locomotive automatically inhibits throttle control on that unit. Each unit can individually be operated as either a lead or trailing locomotive. In a given situation if it is desired to operate one unit as a lead locomotive it provides voltage signals to the other trailing units, connected in an electrical series. Under these conditions the trailing units are responsive to the level of voltage transmitted from the lead unit and re-transmit the lead signal diminished by a pre-determined amount.

In operation, the initial startup of all units as above, follow the settings of the lead locomotive identically, providing maximum horsepower for initial train operation. If after the train has reached a desired speed and it is necessary to reduce the throttle settings, rather than reduce all units to a less efficient setting, it is possible to simply operate the convenient push button switches, reference FIG. 2 contained in the lead locomotive control unit, wherein if the switch designated as No. 40 is actuated, a pre-determined voltage is transmitted to the first trailing unit through a trainline wire using negative or ground, thereby return, returning that unit to idle position. Any required horsepower increase is now made up by operating switch No. 41 of the lead locomotive reducing the transmitted voltage. It should be noted that at this point with the system in operation the lead locomotive becomes, and those units remaining on line, essentially a vernier providing increments of horsepower in less than one total unit horsepower. When subsequent reductions of horsepower require that the units be operated at an inefficient throttle setting, that is, below seven to eight, the lead control switch is once again actuated providing an additional increment of voltage which is essentially passed through the first trailing unit, actuating the second trailing control unit reducing the second trailing locomotive to idle speed. Again, the remaining unit horsepower can then be increased by the throttle position to provide operation at a substantially higher and more efficient horsepower setting.

As those skilled in the art will recognize, this process continues as horsepower requirements are increased or decreased providing the entire consist with operation at a highly efficient throttle setting.

In an alternate embodiment, identical control components are utilized and in addition, a second control unit is provided for exclusive use in a unit designated as a lead locomotive. This method provides voltage signals to the again series-connected trailing units which are now dependent on the throttle position of the lead unit and not on deliberate actuation of the lead unit control box.

This method utilizes a combination of push buttons and control relays provides for the use of all locomotive units or consist power on initial startup to throttle position 8, after which any subsequent reduction in throttle setting does not drop all units say to throttle 7 as in the case with present control systems. According to the invention disclosed here, with this device, after a consist has been operated at maximum throttle, a reduction to throttle position 7 of the lead locomotive automatically reduces the first trailing unit to throttle position 1, while all other units remain in throttle position 8. A subsequent reduction of the lead unit throttle for example, to throttle position 6, changes the throttle setting of the second trailing unit to throttle position 1. An increase in throttle position from 6th run to 7th run will reverse this process and return the second trailing unit to the full power (throttle position 8th run) conditions. A subsequent move to throttle 8 will place the first trailing unit back on line to 8th throttle position run conditions. This process continues until the lead throttle position has reached throttle 2, when all alternate control from this device is removed, and power is now available from all units at run 2 speed.

An increase in throttle will increase all engines speeds normally until 8th run is reached. The process described above will again take place when the throttle of the lead locomotive is reduced to 7. The first trailing unit will be reduced to run 1 throttle speed and so on. The speed of a train can now be regulated by the throttle position as is done normally, with one exception. The speed is now maintained by reducing more engines to run 1 or by increasing more engines to full power with the movement and position of the throttle in the lead control locomotive.

The invention disclosed herein contemplates use of combinations of these devices available to users to fit their operating rules and needs providing a further improvement over present control systems.

BRIEF DESCRIPTION OF THE DRAWINGS

Other objects and advantages of the invention will become apparent upon reading the following detailed description and upon reference to the drawings in which:

FIG. 4 is a chart indicating the conventional "trainline wire arrangements".

FIG. 5 is a schematic diagram showing connection of the speed control solenoids of a commonly used locomotive electro-hydraulic governor, and their relationship to the throttle switches of FIG. 6.

FIG. 6. is a circuit diagram of the alternate throttle-actuated embodiment.

FIGS. 7, and 8, are schematic diagrams of alternate functionally equivalent embodiments of the diode bridge 1 of FIG. 2.

DETAILED DESCRIPTION OF THE INVENTION

Figure 1:
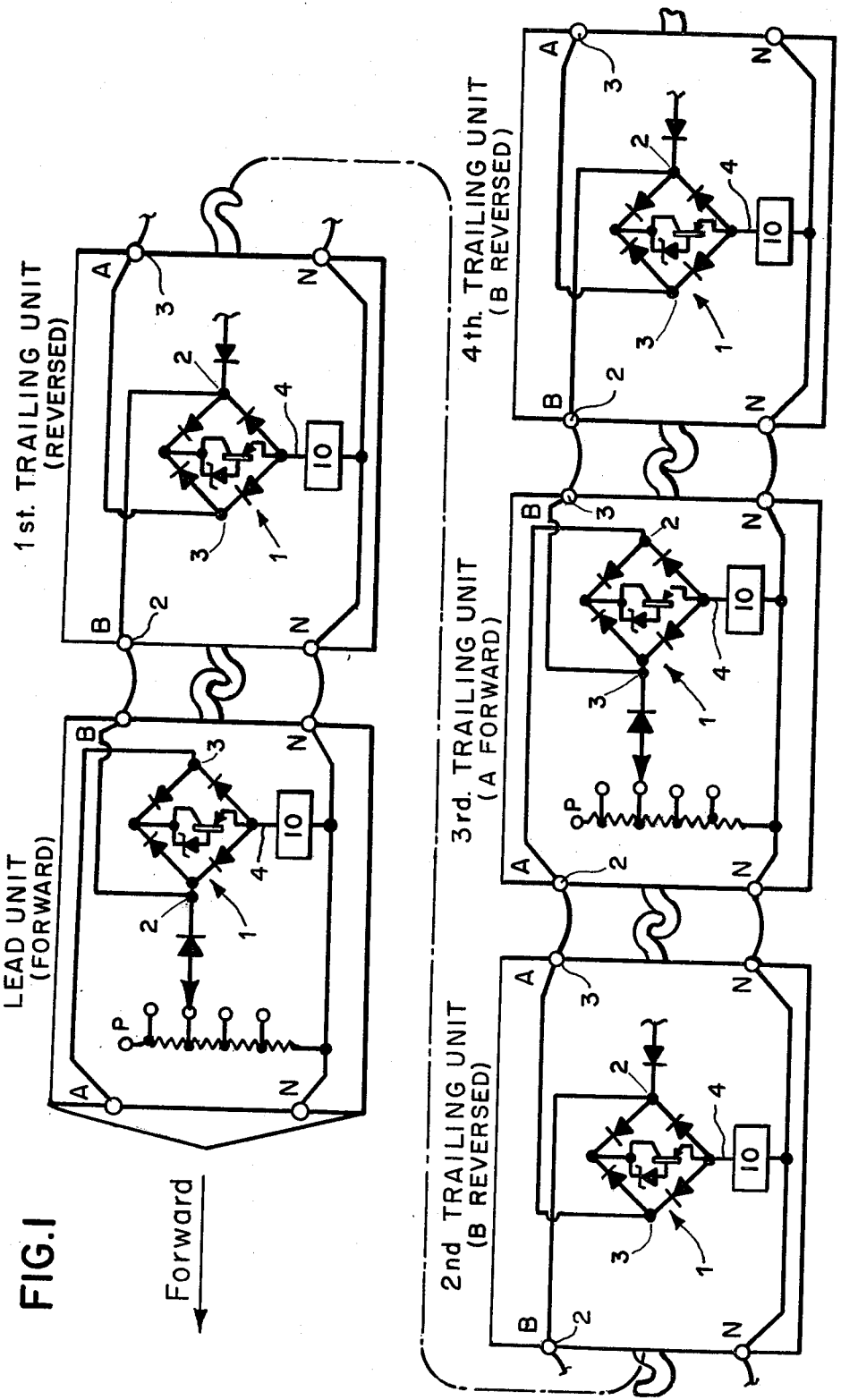
FIG. 1 is a semi-pictorial functional block diagram depicting the signal relationships between a lead locomotive and four trailing units.
Figure 2:
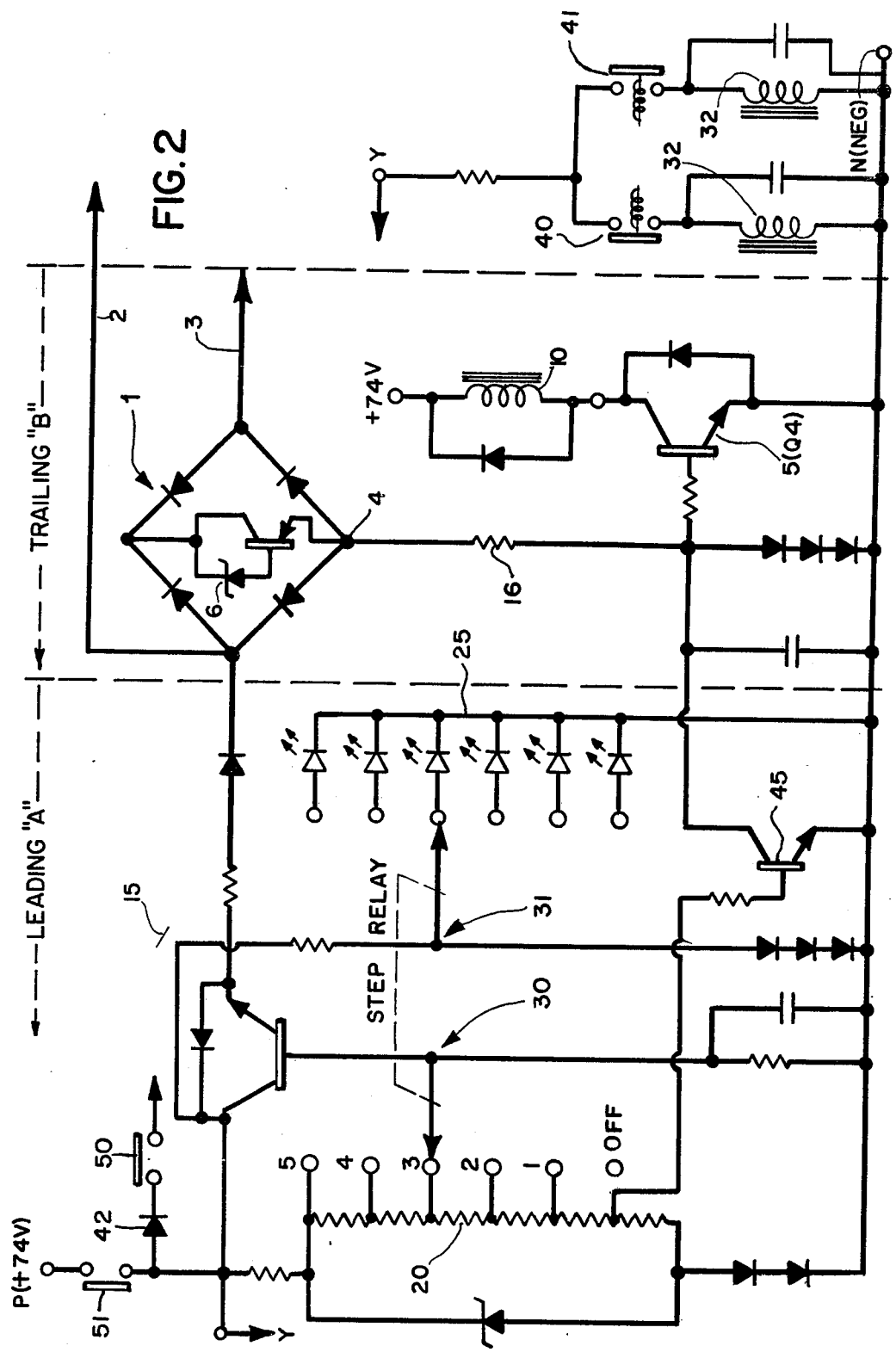
FIG. 2 is a circuit diagram of the preferred control unit embodiment including both lead and trailing portions.

Turning first to FIG. 1 where the control box of the system is depicted in physical relationship of a locomotive consist employing five power units. As indicated "A" is the lead unit with subsequent "B" and "A" units indicated in the trailing mode oriented either "forward and reverse". For the sake of clarity, the diode bridge 1 of FIG. 2 is pictorially represented in each locomotive depicted in FIG. 1. However, as will be discussed subsequently, a control unit, again in reference to FIG. 2, can consist of a complete unit as shown on FIG. 2 or only a "B" portion of the unit. This distinction is necessary since certain locomotive power are essentially always designated as trailing units when they are behind the head or lead locomotive having facilities for an engineer which are not used. In this type of unit the "B" controller would be used exclusively on an "A" unit when trailing. On the other hand, the more general case would involve the use of the entire controller as will be further described whose circuit is disclosed in FIG. 2.

Returning to FIG. 2 and FIG. 3, the following discussion will essentially cover salient circuit functions of the units disclosed, when they are essential to the understanding of the invention claimed. It is assumed that those skilled in the electronic arts are sufficiently familiar with the functions of the essentially routine circuitry to readily understand its function after explanation of purpose.

In FIG. 2, control power is provided from the locomotive control source of 74 volts D.C. through the throttle switch 51. An additional switch on the control console sometimes designated the generator field switch, also supplies power to the generator field trainline (reference FIG. 4) through diode 42 utilized to prevent backfeeding of the controller from the generator field trainline. D-C control power is therefore supplied to the combination voltage divider 20 and regulator 15 wired essentially across the control voltage and negative. An additional light-emitting diode bank 25 is connected with its common end to negative and individually supplied by the arm 31 of an electromagnetic stepswitch consisting of arms 30, 31 and upcoil 32, and downcoil 33. The purpose of these stepswitches is to provide control of the number of trailing units disconnected through the pushbuttons 40 and 41, which actuate the aforementioned up and down coils thereby changing the locations on the voltage divider of the arm 30. Simultaneously, the arm 31 by energizing the proper light-emitting diodes contained in the bank 25, indicates the number of units in operation.

The voltage responsive portion of the controller FIG. 2 is terminated in "A" or "Front Terminal 3" and "B" or "Rear Terminal 2" as indicated. The terminations emanate from circuit designated as 1, which is utilized to select the most positive of any voltage impressed on the terminals 2 and 3, with a signal voltage output between 4 and Negative. The use of a diode bridge as disclosed therefore renders the responsive portion of the controller insensitive to the direction of connection which is of substantial value train operations where locomotive are often reversed.

Returning now to the output end of the bridge 1, designated as 4, communicates with the transistor 5 (Q4) in a manner that allows Q-4 to operate the governor unloading contactor 10. This occurs when sufficient voltage is impressed across terminals 2 and 3 in either polarity to overcome the reverse breakdown potential of the Zener diode 6, which essentially measures the difference in potential between voltages impressed on terminals 2 and 3.

Although a diode bridge 1 is shown in FIGS. 1 and 2, it is submitted that other circuits can be used to select the "most positive" of two voltage signals impressed between points 2, 3, and negative. FIGS. 7 and 8 show alternate approaches to the use of four diodes, a Zener diode, and transistor, 1 in FIG. 2. Those skilled in the art will readily recognize the circuitry disclosed.

Assuming that (reference FIG. 1) terminals 2 and 3 were connected between a forward or lead unit and a subsequent trailing unit such as reverse unit 1, when sufficient potential occurred, the operation of relay 10 would reduce the power setting of the governor in the locomotive containing control unit (2 of FIG. 2) to the idle position.

Figure 3:
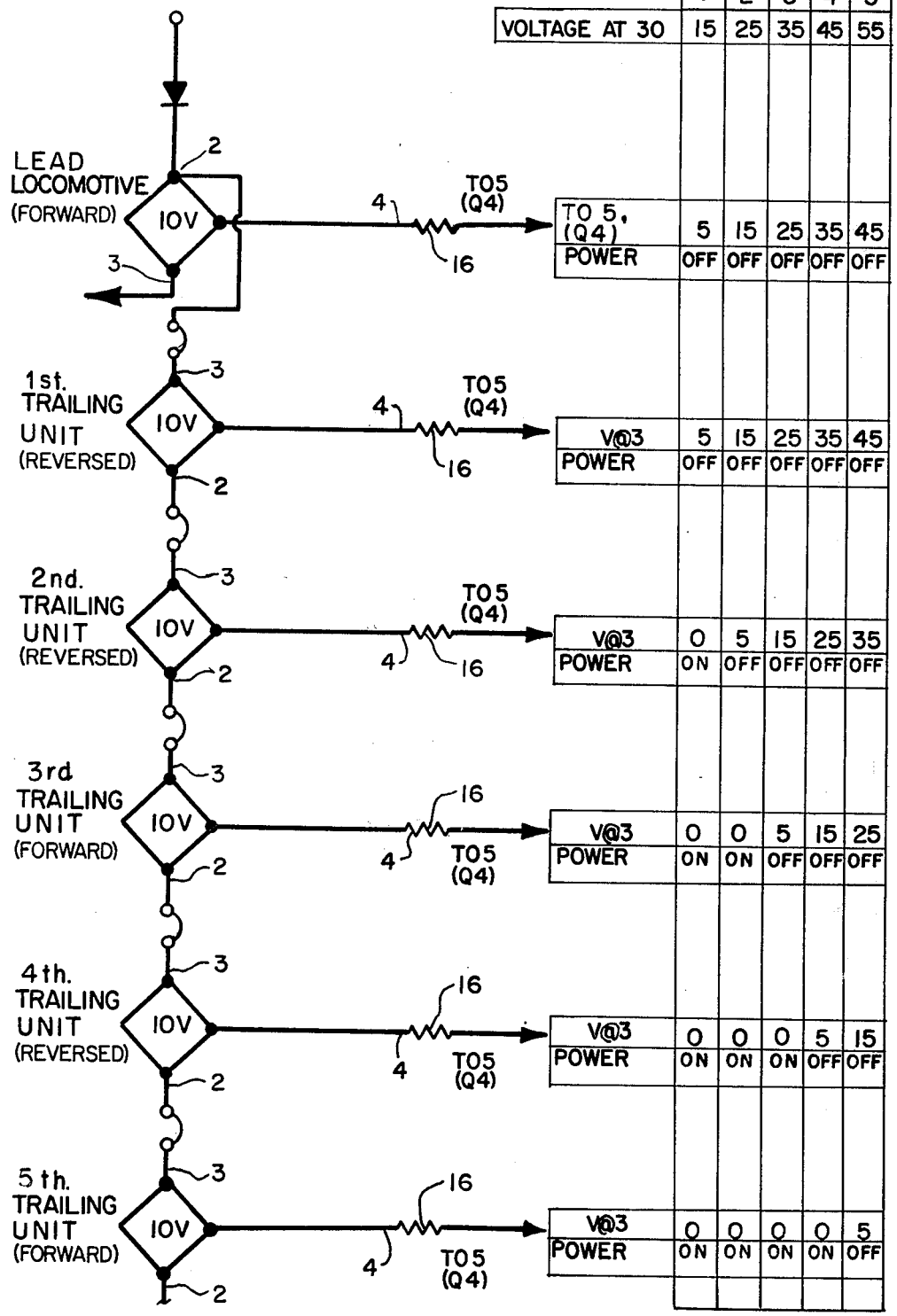
FIG. 3 is a modified functional block diagram of the controller showing signal flows and major component interconnections, and typical signal voltages at each power unit.

Turning now to FIG. 2 and FIG. 3, additional operation of either pushbutton 40 or pushbutton 41, moving the arms 30 and 31 of the stepswitch would impress on the single common trainline as indicated above, an additional voltage change resulting in either actuation or de-actuation of the relay 10 contained in the trailing unit, with subsequent reduction of the locomotive throttle to idle or increase in the governor's setting to a pre-determined optimum setting.

A feature of the control system is the ability to keep the train and all locomotives "stretched" with no slack action between any locomotives or cars. This is accomplished by keeping the lead locomotive in a power producing mode and starting the process or returning engines to run 1 with the second unit in the consist designated as trailing unit 1 in FIG. 1. This is accomplished by closing switch 51 and imposing a a bias voltage signal from the divider 20 acting on transistor 45, or Q2 would in turn bias transistor 5 or Q2 preventing operation of relay 10. Therefore, the bridge located in forward unit 1 of FIG. 1, would in effect not be responsive to signals from the lead or forward locomotive.

As indicated previously, an alternate embodiment of the system disclosed is completely compatible with the above described control unit in the trailing mode and provides automatic reduction of trailing units with lead locomotive throttle position. Under these conditions it is not necessary for the engineer to manually actuate the above mentioned up/down pushbuttons 40 and 41. Addition or reduction of the consist power units is accomplished by positioning of the normal throttle lever in the lead locomotive.

This operation requires an additional control box containing the circuitry essentially as described in FIG. 6, although those skilled in the electrical and electronic parts will readily recognize that other circuitry could be applied as well.

Turning now to FIG. 6 where the additional controller of the alternate embodiment described above, is essentially designed to be inserted between the control and interlock switches contained in the normal locomotive throttle as represented by switches 105, 110, 115, and 120 and the conventional locomotive trainline circuits (reference FIG. 4) A, B, C, and D. It should be noted on FIG. 4 that that actuation of the various throttle speeds between 1 and 8 is essentially caused by the operation of governor coils A, B, C, and D (reference FIG. 5) corresponding to the above noted throttle switches. The throttle-operated controller disclosed in FIG. 6 is powered through throttle switch (115) (C) which is further energized from the C trainline connection 132 (CTL) through a throttle interlock switch 150 and pushbutton switch 151.

Since the operation of this controller is in essence similar at each position, the following functional description preceding a detailed circuit description will be of value. As briefly discussed above, this alternate embodiment utilizes the conventional trainline wires shown on FIG. 4 to actuate the remote unit governor solenoid coils for the throttle positions 1 through 8 (reference FIG. 5). Therefore, in startup, total consist power is available to the engineer and each unit operates at identical throttle positions as the train gets underway. However, when throttle position 8 is reached, with the alternate embodiment controller operating, a reduction in lead engine throttle to position 7 results in reducing the trailing locomotive immediately behind the lead locomotive to throttle position 1. A further reduction in lead throttle to 6 results in a reduction in throttle position of the second trailing locomotive to throttle position 1. This sequence is carried on until the lead locomotive throttle reaches position 2 at which point the entire control system reverts to conventional simultaneously throttle operation.

The above is accomplished (reference FIG. 7) through the use of an auxiliary contactor 140 (TLR) connected as indicated through throttle interlock switches 105, 110, 115.

As indicated above, since throttle operation in this mode is essentially the same, only the startup sequence will be covered in detailed, those skilled in the art will find no difficulty in following the operation of subsequent throttle functions.

Briefly turning to FIG. 4, it should be noticed that throttle position 1 requires no connection of contacts A, B, C, or D. Therefore contacts 105, (A) 110, (B) 115 (C) and 120 (D) and their normally closed and open counterparts are in the positions shown in FIG. 6.

It should be noted that energization of throttle relay coils 126 (A), 127 (B), and 128 (D), controls contacts (A), (B), and (D), as indicated in FIG. 6. As the throttle progresses through the positions 1 through 8, the throttle switches mentioned above, proceeds through the various combinations as indicated, on reaching throttle position 8, contacts 105 (A), 110 (B), 115 (C), will be actuated (Ref. FIG. 4) thereby being in positions opposite to those indicated in FIG. 6. As A, B, C are now closed, power is supplied to the coil of 140 (TLR) through trainline (CT), 132. And as indicated above the TLR relay 140 is now actuated by push button #151.

Assuming that pushbutton 151 (PB-on) has been actuated, and contactor coil 140 (TLR) has been held in through its normally open contact 141, an indicator light 155 announces the alternate embodiment is in operation and the lead locomotive is in throttle position 8, the following sequence occurs:

Due to a drop in the need for consist power if the lead locomotive throttle setting is now reduced to 7, contact 105 (A) essentially reverts to the position shown in FIG. 6 except for coil 140, now energized through its normally open contact 141, normally closed "off" push button 152, and locomotive throttle contact 150. Contact 150 remains closed for all throttle positions. Coil 140 or (TLR) actuates contacts 141, 142, 143, and 144. With coil 140 deenergized as in the case of a trailing unit, contact 144 would be open, 142 would be open, and contact 143 would be closed. This condition allows operation of the governor unload relay 10 through application of a bias voltage from line 18 to NPN transistor circuit 130. Subsequent increases of voltage appearing on line 18 would therefore operate additional trailing units. Voltages transmitted along line 18 through the Zener diode combination 221 and 222, and would be decreased by the drops associated with diodes 221 and 222 as disclosed above. Therefore, throttle relay coil A, 126, is de-energized (Ref. FIG. 4) and more importantly, a voltage is supplied through the voltage divider 100 and its associated "A" contacts through TLR contact 142 and 144 to the junction of diodes 221 and 222. Therefore an additional voltage is now present on trainline 18 resulting in actuation of the next B unit as indicated in FIG. 2. This results in operation of contactor 10 and the reduction of that unit either to idle or throttle position 1, resulting in a sufficient horsepower reduction to allow the engineer of the lead locomotive to maintain speed. This action places the consist or power train in a substantially more economical fuel consumption mode since a lesser number of units are now operating at higher throttle settings.

Contacts 142 and 143 provide isolation or actuation of the unloading governor coil 10. With contractor coil 140 energized, i.e., in a lead locomotive, contact 142 would be closed and contact 143 would be open. This condition supplies a signal voltage through (A), and (B) interlock contacts from divider 100, thereby supplying a signal voltage through diodes 221, or 222, to trainline 18F or 18R respectively. As in the case of the diode bridge discussed above, signal voltage is best transmitted to subsequent trailing power units, whereby successive units are reduced to idle as increased voltage from divider 10 is applied to control wire 18. This occurs as the lead locomotive throttle is retracted from position 8 as previously discussed.

Subsequent throttle excursions essentially operate in the same manner and those skilled in the art will recognize the function of the circuitry disclosed in FIG. 6 and FIG. 2. It should be noted that the alternate embodiment disclosed above can be utilized in a mandatory way unlike that of the preferred embodiment, where reduction in trailing unit power is a manual operation at the discretion of the engineer.

The above mentioned operation can be made automatic by the elimination of pushbutton #151 joining these wires. Therefore any time an engineer reaches throttle position #8 the system automatically energizes and is ready for operation.

Thus it is apparent that there has been provided in accordance with the invention, a locomotive control system and method, along with hardware providing a substantial reduction in fuel consumption of multiple locomotive consists. This is accomplished by recognizing the increased efficiency of operating a given locomotive at its most economic horsepower setting. While the invention has been described in conjunction with a preferred and alternate embodiment, it is evident that other alternatives, modifications and variations will be apparent to those skilled in the electrical and the electromagnetic arts. Accordingly, it is intended that the disclosure embrace the alternatives as those so skilled may conceive as many variations as fall within this broad scope of the appended claims.

We claim:

1. Apparatus for operating a multiple locomotive consist having lead and trailing locomotive units, in spaced relationship, at economic power levels, comprising:

means pre-determining discreet power operating levels contained in the lead unit, and generating a plurality of pre-determined voltage levels corresponding to an integral number of trailing locomotives;

means establishing electrical communication between lead and trailing units for propagating said generated voltages;

means contained in each locomotive, responding to said voltage levels, and transmitting said voltage diminished by at least one level;

means actuated by said responding means for selectively varying the power levels in predetermined trailing units, from one said level to another;

whereby the total consist power controlled from the lead unit, comprises a combination of pre-determined levels of trailing unit power, and the individual setting of the lead unit, providing efficient operating power levels for each locomotive.

2. The apparatus of claim 1 wherein each locomotive has first and second ends, and the electrical communicating means are two trainline wires, terminated at each end to serially connect said responding means.

3. Apparatus as described in claims 1 or 2 wherein the isolating means is a biased transistor.

4. The apparatus of claim 2 further comprising;
means selectively isolating said responding means in at least the lead locomotive.

5. Apparatus as described in claim 1 wherein the responding means comprises semi conductor for selecting the most positive input from said trainline wires.

6. Apparatus as described in claim 1 wherein said generating means is an electromagnetic stepswitch and voltage divider.

7. In a controller for selectively adjusting the throttle setting of a locomotive in response to a remote signal, the improvement comprising;
means selectively generating a plurality of first signals corresponding to preselected levels of locomotive tractive effort, for a first operating condition;
means selectively responsive to said first signal, and generating a second signal, for a second operating condition;
means responsive to said second signal for varying the throttle setting of the locomotive;
means preselecting said operating condition, wherein controller operation in said first condition inhibits generation of second signal, providing normal throttle operation of the locomotive while generating said first signals.

8. The controller of claim 7 wherein said first signal generating means include a stepswitch and light-emitting diodes for producing pre-determined signals, and providing indication of the signal level.

9. The controller of claim 8, wherein said second signal responsive means is an electromechanical contactor cooperating with said locomotive throttle setting.

10. The controller of claim 9 wherein said preselecting means is a biased transistor inhibiting operation of said electromagnetic contactor.

11. In combination, apparatus for operating a multiple locomotive consist at economic horsepower settings, having;
a lead locomotive;
a plurality of trailing locomotives sequentially spaced relative said lead locomotive, having first and second pre-determined power settings;
means connecting said lead and trailing locomotives in electrical series;
wherein the improvement comprises;
means generating a plurality of pre-determined voltage levels, corresponding an integral number of trailing locomotives for transmission by the connecting means, in said lead locomotive;
means in each locomotive responding to said voltage level and transmitting said level diminished by at least one level;
means selectively isolating said responding means in at least said lead locomotive;

means actuated by said responding means reducing horsepower setting of the locomotive from said first to second settings;

whereby the total consist horsepower is varied in sequential steps, corresponding to the number of trailing units, and the individual setting of each lead unit providing efficient operating levels for each trailing unit.

12. Apparatus of claim 11, wherein the generating means is an electromechanical stepswitch, and a voltage divider.

13. In combination, apparatus for operating a multiple locomotive consist at economic horsepower settings comprising;
a lead locomotive utilizing discreet governor controlled throttle settings for increasing and decreasing tractive effort;
a plurality of trailing locomotives having first and second groups of throttle settings spaced relative said lead locomotive;
means in said trailing locomotives, responsive to said lead locomotive throttle establishing said first group of throttle settings;
means connecting said lead and trailing locomotives in electrical series;
means, in said locomotives, generating a plurality of pre-determined voltage levels corresponding to said second group of throttle settings, for transmission by the connecting means after reaching a pre-determined setting;
means in each locomotive responding to said voltage levels and transmitting said level varied by at least one level;
means in each locomotive actuated by said responding means, for selectively varying said throttle settings;
means selectively inhibiting said responding means in at least said lead locomotive;
whereby lead locomotive throttle settings vary total consist horsepower in discreet steps on reaching a pre-determined setting.

14. The apparatus of claim 13, wherein the generating means comprises an electromagnetic relay, voltage divider, and throttle interlock switches.

15. The apparatus of claim 14, wherein said inhibiting means is a biased transistor.

16. The apparatus of claim 15, wherein said responding means is an electromagnetic relay.

17. A method of operating a multiple locomotive train of the type utilizing lead and trailing locomotive units in sequentially spaced relationship, each unit having a governor controlled multi-position throttle for controlling individual tractive power, comprising the steps of;
connecting lead and trailing units in electrical series;
generating a plurality of discreet voltage levels in the lead unit, corresponding to pre-determined trailing unit power settings;
transmitting said voltage levels to be trailing units;
re-transmitting said voltage level diminished by one level to an adjacent trailing unit;
responding to at least one said voltage level in each trailing unit by varying individual unit power settings;
inhibiting said trailing unit response to the lead unit;
whereby total train power comprises discreet trailing unit levels and an individual lead unit throttle setting.

18. A method of controlling total tractive power in a multiple locomotive train of the type utilizing lead and trailing locomotive units, each unit having a governor controlled multi-position power control throttle, comprising the steps of;
- connecting the lead and trailing units in electrical series;
- generating a plurality of predetermined voltage levels in said lead locomotive, corresponding to unit throttle settings said voltage levels having first and second groups;
- transmitting said generated voltages to the trailing units;
- inhibiting said first group of voltages for increasing throttle settings;
- responding to said second group voltage level in each trailing unit;
- varying said unit power in accord with said response;
- inhibiting said trailing unit response in at least the lead unit;
- whereby total train tractive power is comprises discreet trailing unit levels, and individual lead unit level, after a maximum lead unit setting.

19. In apparatus for operating a multiple locomotive consist having lead and trailing locomotive units, in spaced relationship, at economic power levels, the improvement comprising;
- means pre-determining discreet power operating levels contained in said units, and generating a plurality of pre-determined voltage levels corresponding to said levels in an integral number of trailing locomotives;
- means establishing electrical communication between lead and trailing units for propagating said generated voltages;
- means contained in each locomotive, responding to said voltage levels, and transmitting said voltage diminished by at least one level;
- means selectively isolating said responding means in at least the lead locomotive defining a lead locomotive power level;
- means actuated by said responding means for selectively varying the power levels in predetermined trailing units, from one said level to another less than said lead level;
- whereby the total consist power controlled from the lead unit, comprises a combination of pre-determined levels of trailing unit power, and the individual setting of the lead unit, providing efficient operating power levels for each locomotive.

20. The apparatus of claim 19 wherein each locomotive has first and second ends, and the electrical communicating means are two trainline wires, terminated at each end to serially connect said responding means.

21. Apparatus as described in claims 19 or 20 wherein the isolating means is a biased transistor.

22. Apparatus as described in claim 20 wherein the responding means comprises semiconductor means for selecting the most positive input from said trainline wires.

23. Apparatus as described in claim 19 wherein said generating means is an electromagnetic stepswitch and voltage divider.

24. In combination, apparatus for operating a multiple locomotive consist at economic horsepower settings having;
- a lead locomotive utilizing discrete governor controlled throttle settings for increasing and decreasing horse power and tractive effort;
- a plurality of trailing locomotives sequentially spaced relative said lead locomotive;
- wherein the improvement comprises;
- means connecting said lead and trailing locomotives in electrical series;
- means in said lead locomotive generating a plurality of pre-determined groups of first and second voltage levels for increasing and decreasing throttle settings, respectively, for transmission by said connecting means to said trailing locomotives;
- means in said lead locomotive inhibiting said transmission, for said first group of settings;
- means in each locomotive responding to said voltage levels increasing and decreasing said throttle settings and defining a trailing locomotive throttle setting;
- means selectively inhibiting said responding means in at least said lead locomotive defining a lead locomotive throttle setting greater than said trailing setting;
- whereby lead locomotive throttle settings vary total consist horsepower in discrete steps on reaching a pre-determined setting.

25. The apparatus of claim 24, wherein the generating means comprises an electromagnetic relay, voltage divider, and throttle interlock switches.

26. The apparatus of claim 25, wherein aid inhibiting means is a biased transistor.

27. The apparatus of claim 26, wherein said responding means is an electromagnetic relay.

28. A method of operating a multiple locomotive train of the type utilizing lead and trailing locomotive units in sequentially spaced relationship, each unit having a governor controlled multi-position throttle for controlling individual tractive power, comprising the steps of;
- connecting lead and trailing units in electrical series;
- generating a plurality of discrete voltage levels in the lead unit, corresponding to and defining pre-determined trailing unit power settings;
- responding to at least one said voltage level in each trailing unit by varying individual unit power;
- inhibiting said responds in the lead unit defining a lead unit power setting greater than said trailing unit;
- transmitting said voltage levels to the trailing units;
- re-transmitting said voltage level diminished by one level to an adjacent trailing unit;
- whereby total train power comprises discrete trailing unit levels and an individual lead unit power setting.

* * * * *